July 31, 1934.   P. LOFGREN   1,968,563
METHOD OF MAKING A FEMALE PIPE COUPLING MEMBER
Filed June 5, 1931   3 Sheets-Sheet 2

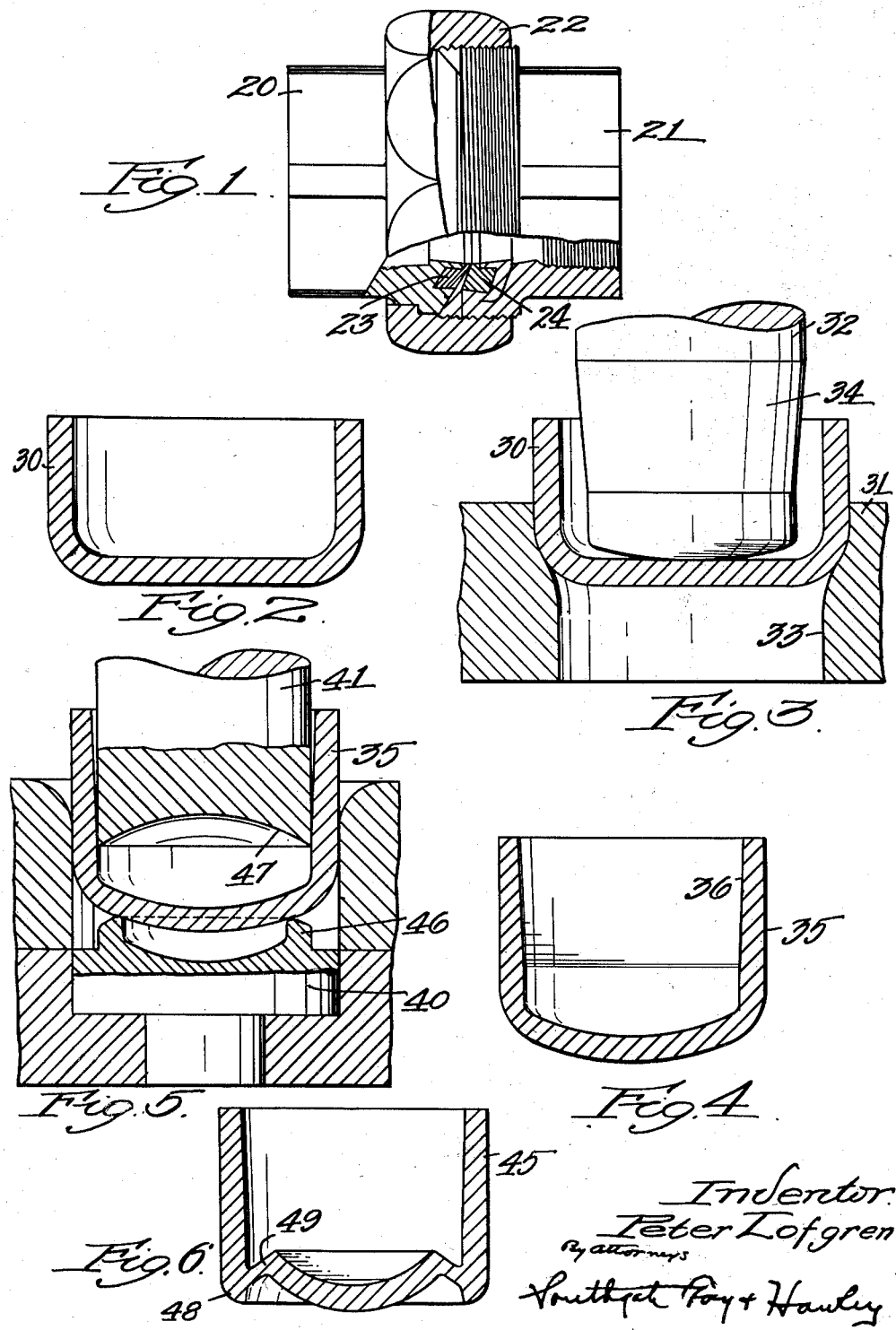

Inventor
Peter Lofgren.
By attorneys
Southgate Fay & Hawley

July 31, 1934. P. LOFGREN 1,968,563
METHOD OF MAKING A FEMALE PIPE COUPLING MEMBER
Filed June 5, 1931 3 Sheets-Sheet 3
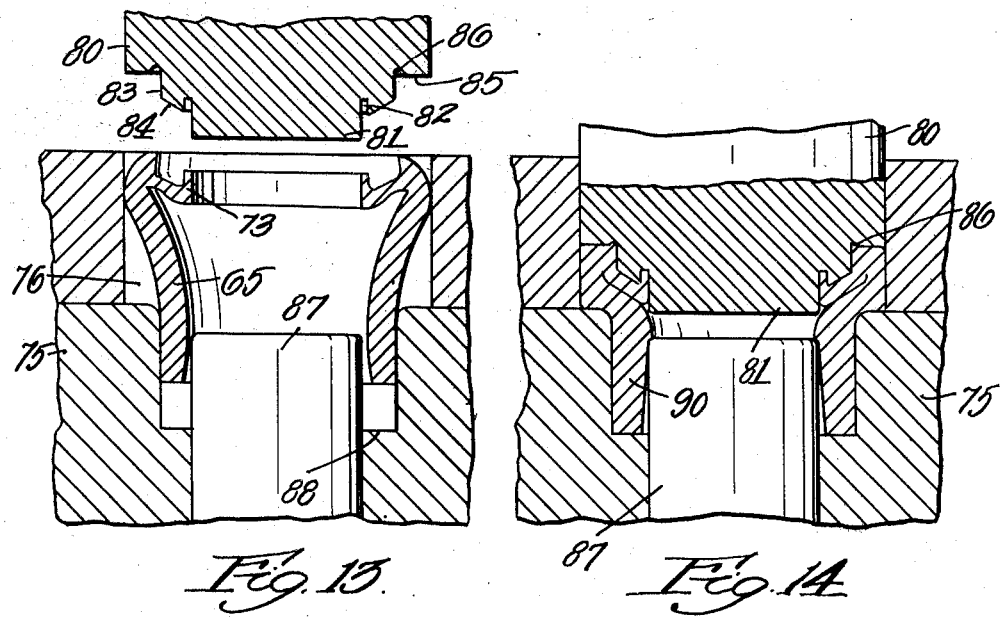
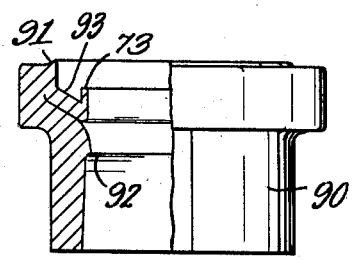
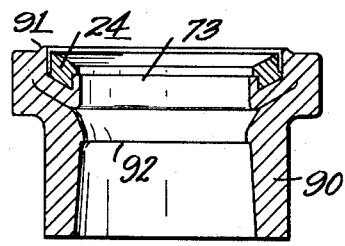
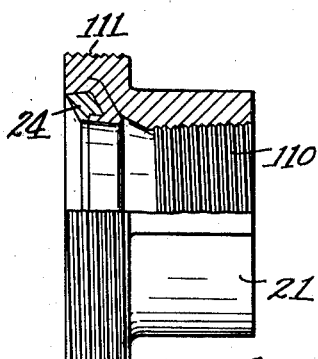
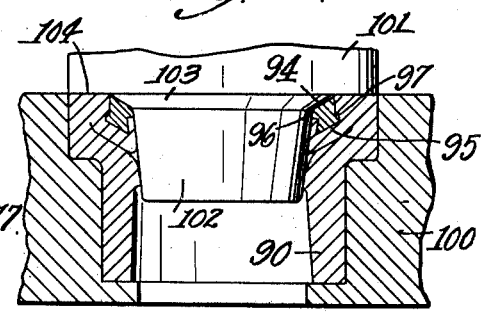
Inventor
Peter Lofgren
By attorneys
Southgate Hays & Hawley Patented July 31, 1934

1,968,563

UNITED STATES PATENT OFFICE 1,968,563

METHOD OF MAKING A FEMALE PIPE COUPLING MEMBER

Peter Lofgren, Worcester, Mass., assignor to Rockwood Sprinkler Company of Massachusetts, Worcester, Mass., a corporation of Massachusetts Application June 5, 1931, Serial No. 542,361

4 Claims. (Cl. 29—157)

This invention relates to pipe couplings of the type in which a non-corrosive seating ring is provided in the contacting face of each coupling member.

The details of construction of the male coupling member and the seating ring and the methods of making these elements form the subject-matter of copending applications, Serial Nos. 514,016 and 514,018, filed by me on February 6, 1931. This present application relates particularly to the female coupling member and to a novel and improved method of making the same and is a continuation in part of my prior application, Serial No. 514,017.

It is the general object of the present invention to provide a female pipe coupling member of such construction that it may be conveniently formed from a sheet metal blank by successive press and drawing operations.

A further object is to provide a female pipe coupling member adapted to support a non-corrodible seating ring of minimum cross section and to firmly secure the seating ring against displacement in the coupling member.

My invention further relates to certain arrangements and combinations of parts and to a certain succession of operations, all of which will be hereinafter described and more particularly pointed out in the appended claims.

A preferred form of the invention is shown in the drawings, together with certain tools used in the production thereof and illustrating successive manufacturing steps.

Fig. 1 is a side elevation, partly in section, of my improved pipe coupling;

Fig. 2 is a sectional view of a blank for the female coupling member after the first drawing operation;

Fig. 3 is a sectional elevation showing the dies used in the second drawing operation;

Fig. 4 is a sectional view of the blank produced by the second operation;

Fig. 5 is a sectional elevation showing the dies used in the third press operation;

Fig. 6 is a sectional view of the blank after the third operation has been performed;

Fig. 13 is a sectional elevation showing the forming dies used in the seventh operation;

Fig. 14 is a sectional elevation showing the same dies closed at the end of the seventh operation;

Fig. 15 is a sectional elevation of the blank produced by the seventh operation;

Fig. 16 is a sectional elevation of the blank, with the seating ring assembled in a recess thereof;

Fig. 17 is a sectional elevation showing the dies for performing the eighth or final press operation, and Fig. 18 is a side view, partly in section, of the finished coupling member.

Figure 7:
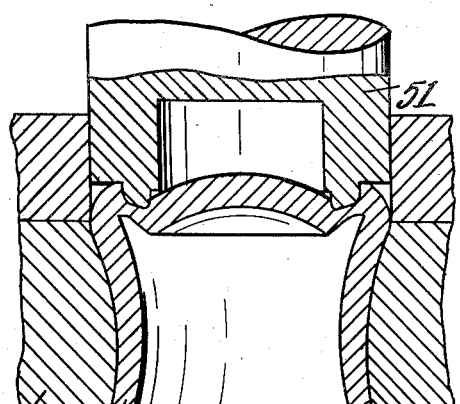
Fig. 7 is a sectional elevation of the dies used in the fourth press operation.

Referring to Fig. 1, I have shown a pipe coupling comprising a male coupling member 20, a female coupling member 21 and a clamping nut 22. A seating ring 23 is assembled in the face of the male coupling member 20 and a seating ring 24 is assembled in the face of the female coupling member 21. The nut 22 is of a usual commercial form and the male member 20 and the seating rings form the subject-matter of copending applications, as above stated.

The present application relates particularly to the female coupling member 21 and to the method of producing the same and of assembling and securing the seating ring 24 therein.

This female coupling member 21 is preferably formed from relatively heavy sheet steel and the seating ring 24 is preferably formed of brass or bronze or of some other non-corrodible metal.

A flat disc of sheet steel of substantial thickness is submitted to a first and ordinary drawing operation to produce a blank 30 having the cup-shaped section shown in Fig. 2.

The blank 30 is then submitted to a second drawing operation, which is performed by the dies 31 and 32 shown in Fig. 3. The female die 31 is inwardly contracted at 33 and the male die or punch 32 has a conically tapered intermediate portion 34. The operation of these dies produces the blank 35 shown in Fig. 4, with the side wall tapered outward on its inner face as indicated at 36, the side wall being gradually reduced in thickness upwardly.

The blank 35 is then placed between the forming dies 40 and 41 shown in Fig. 5 and a third press operation is performed, transforming the blank 35 of Fig. 4 to the blank 45 shown in Fig. 6.

It will be noted that the lower die 40 has an upwardly projecting flange 46 and that the lower end of the upper die 41 is arched or concaved at 47. These dies 40 and 41 coact to display the center portion of the blank 35 upward and to form an outer bottom flange 48 and an upwardly inclined connecting portion 49 in the blank 45 (Fig. 6).

A fourth or reducing operation is then performed on the blank 45 by forming dies 50 and 51 (Fig. 7) by which operation the lower part of the blank 45 is reduced in diameter but increased in thickness of wall. The section of the new blank 55 is shown in Fig. 7.

Figure 8:
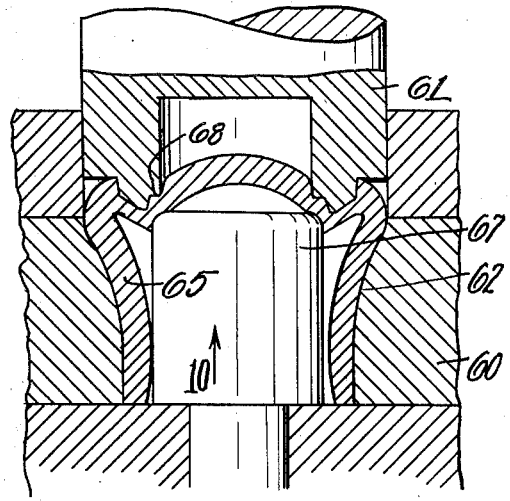
Fig. 8 is a similar view of the dies used in the fifth press operation.
Figure 9:
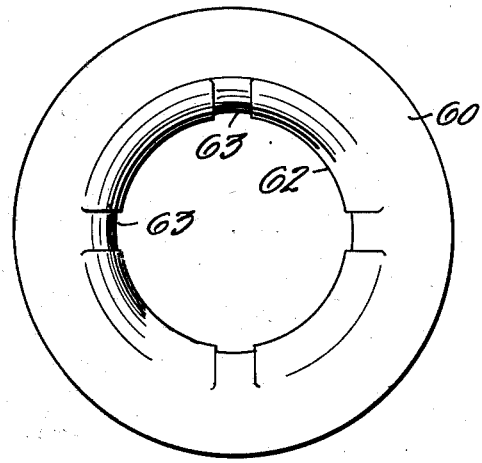
Fig. 9 is a plan view of the female die shown in section in Fig. 8.

The blank 55 is then submitted to a fifth press operation in dies 60 and 61 (Fig. 8). The die 60 has an opening 62 which is contracted downwardly and which is somewhat less in diameter than the corresponding opening of the die 50. The die 60 is also provided with spaced shallow recesses 63 in its peripheral wall.

Figure 10:
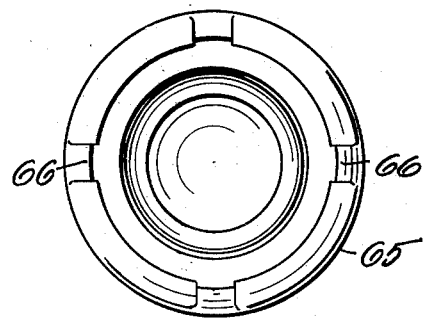
Fig. 10 is a bottom view of the blank after the fifth press operation, looking in the direction of the arrow 10 in Fig. 8.

When the blank 55 is forced into the die 60 by the male die or plunger 61, the blank 55 is further contracted to form a new blank 65 of reduced diameter. Portions of the blank 65 are forced into the shallow recesses 63 in the die 60 to form ribs 66 (Fig. 10) on the outer surface of the blank, to which a wrench or spanner may be applied. A plug 67 (Fig. 8) within the die 60 coacts with portions 68 of the upper die 61 to further shape the outer edge portion of the upwardly convex end portion of the blank 65. The plug 67 may thereafter act as an ejector for the blank 65.

Figure 11:
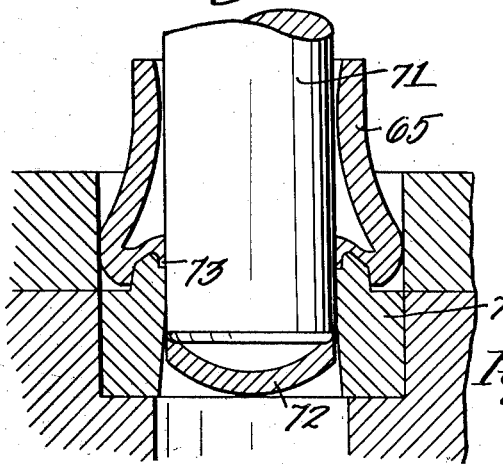
Fig. 11 is a sectional elevation of the dies used for piercing the blank in the sixth operation.
Figure 12:
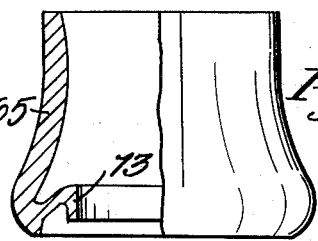
Fig. 12 is a side elevation of the pierced blank, partly in section.

The blank 65 is then inverted and subjected to the action of piercing dies 70 and 71 (Fig. 11) by which a disc or washer 72 is cut from the closed end of the blank, leaving a flange 73 surrounding the pierced opening. The blank 65, after the piercing operation, has the appearance disclosed in Fig. 12.

The blank 65 is then submitted to a seventh press operation in a female drawing die 75 (Fig. 13) having an internal annular recess 76. The corresponding male die or plunger 80 has a projecting portion 81 of reduced diameter, an annular recess 82 adapted to receive the flange 73 of the blank 65, an annular projecting portion 83 having a beveled lower face 84, and an annular flat surface 85 disposed in a plane perpendicular to the axis of the die or plunger 80. A groove 86 is provided in the plunger 80 at the inner edge of the flat surface 85, and a plug 87 is mounted in the lower die 75. The die 75 has an abrupt shoulder 88 surrounding the plug 87.

As the upper die 80 is forced downward against the blank 65, the flange 73 is first seated in the groove 82. The blank 65 is then forced downward by the plunger 80 until the bottom end of the blank engages the shoulder 88. The upper die or plunger 80 continues to move downward, compressing the upper part of the blank 65 into the spaces between the dies 75 and 80 and producing the blank 90 (Figs. 14 and 15). Attention is called to the rib or bead 91 formed on the upper end of the blank 90 by the provision of the groove 86 in the die 80. Note also the shoulder 92 formed against the end of the plug 87.

The seating ring 24 previously mentioned is then placed in the recess 93 formed in the upper face of the blank 90 and given final shape by the projection 84 of the upper die or plunger 80.

This ring 24 is fully shown and described in my copending application Serial No. 514,018, but may be briefly described as being of a substantially diamond-shaped cross section, with inwardly and outwardly beveled upper and lower faces 94 and 95, an inwardly projecting lip 96, and an outwardly projecting bead 97.

The ring 24 is loosely assembled in the recess 93 and the parts are then subjected to an eighth press operation, as indicated in Fig. 17. For this operation, the assembled parts are supported in a female die 100 and are engaged by a male die or plunger 101 having a tapered middle portion 102, an outwardly beveled annular surface 103 and a flat outer surface 104.

The plunger 101 forces the bead 91 on the top of the blank 90 down into the stock of the blank and forcing some of the stock inward above the outwardly projecting bead 97 of the ring.

At the same time, the tapered end portion of the die forces the flange 73 of the coupling blank 90 outward in its upper portion to the position indicated in Fig. 17, thus firmly locking the ring 24 in place and compressing the ring to a slightly dove-tailed cross section.

The female coupling member 21 is then completed by threading the inner and outer portions of the blank 90, as indicated at 110 and 111 in Fig. 18, thus producing the finished article.

From the above description, it will appear that I have produced a female pipe coupling member from a single disc of sheet metal by a series of drawing and press operations and that I have firmly secured a seating ring of non-corrodible metal in the engaging face of the coupling member. Furthermore, it will be seen that this seating ring is of minimum cross section, so that a very small amount of the more expensive non-corrosive metal is required.

Having thus described my invention and the advantages thereof, I do not wish to be limited to the details herein disclosed, otherwise than as set forth in the claims, but what I claim is:—

1. The method of making a female pipe coupling member which consists in forming a cup-shaped blank with an outwardly convex end portion, displacing a part of said convex end portion axially inward and providing an annular portion connecting said displaced convex portion to the side wall of said blank, reducing the diameter of the cylindrical body portion of said blank, thereafter piercing the convex end portion and leaving an annular flange around the axial opening thus formed, upsetting the end portion of the blank and displacing the flanged portion axially toward the body of the coupling until it folds against and firmly engages the upset expanded portion, forming an annular recess around said flange, forming a bead around said recess, placing a seating ring in said recess, compressing the metal at the inside of said flange against said ring, and forcing said bead into the metal underlying the same to displace said metal inward against said ring, thereby firmly securing said ring in position.

2. The method of making a female pipe coupling member which consists in forming a cup-shaped blank with an outwardly convex end portion, displacing a part of said convex end portion axially inward and providing an annular portion of reduced thickness connecting said displaced convex portion to the side wall of said blank at a point inwardly removed from the extreme end thereof, next reducing the diameter of the cylindrical body portion of said blank, thereafter piercing the convex end portion and leaving an upstanding annular flange around the axial opening thus formed, upsetting the end portion of the blank and displacing the flanged portion axially toward the body of the coupling until it folds against and firmly engages the upset expanded portion, forming an annular recess around said flange adapted to receive a non-corrodible seating ring, and firmly securing said ring in position.

3. The method of making a female pipe coupling member which consists in forming a cup-shaped blank with an outwardly convex end portion, displacing a part of said convex end portion axially inward and providing an annular portion connecting said displaced convex portion to the side wall of said blank, reducing the diameter of the cylindrical body portion of said blank, thereafter piercing the convex end portion and leaving an annular flange around the axial opening thus formed, upsetting the end portion of the blank and displacing the flanged portion axially toward the body of the coupling until it folds against and firmly engages the upset expanded portion, forming an annular recess around said flange adapted to receive a non-corrodible seating ring, and firmly securing said ring in position by compressing adjacent parts of the material of the end portion of said coupling blank against the sides of said ring.

4. The method of making a female pipe coupling member which consists in forming a cup-shaped blank with an outwardly convex end portion, displacing a part of said convex end portion axially inward and providing an annular portion connecting said displaced convex portion to the side wall of said blank, reducing the diameter of the cylindrical body portion of said blank, thereafter piercing the convex end portion and leaving an annular flange around the axial opening thus formed, upsetting the end portion of the blank and displacing the flanged portion axially toward the body of the coupling until it folds against and firmly engages the upset expanded portion, forming an annular recess around said flange adapted to receive a non-corrodible seating ring, and firmly securing said ring in position by compressing adjacent parts of the material of the end portion of said coupling blank against the sides of said ring and simultaneously distorting said ring to a dove-tailed cross section.

PETER LOFGREN.